July 18, 1950 G. C. DRAPER 2,515,199
ATTITUDE INDICATOR

Filed Feb. 17, 1945 6 Sheets-Sheet 1

INVENTOR
GEORGE C. DRAPER
By
Alan Swabey
ATTORNEY

July 18, 1950          G. C. DRAPER          2,515,199
ATTITUDE INDICATOR

Filed Feb. 17, 1945          6 Sheets-Sheet 2

INVENTOR
GEORGE C. DRAPER
By
Alan Swabey
ATTORNEY

July 18, 1950            G. C. DRAPER            2,515,199

ATTITUDE INDICATOR

Filed Feb. 17, 1945            6 Sheets-Sheet 3

INVENTOR
GEORGE C. DRAPER
BY
*Clean Smalley*
ATTORNEY

July 18, 1950 G. C. DRAPER 2,515,199
ATTITUDE INDICATOR

Filed Feb. 17, 1945 6 Sheets-Sheet 4

INVENTOR
GEORGE C. DRAPER
BY
ATTORNEY

July 18, 1950   G. C. DRAPER   2,515,199
ATTITUDE INDICATOR
Filed Feb. 17, 1945   6 Sheets-Sheet 5

INVENTOR
GEORGE C. DRAPER
By
Alan Ainsley
ATTORNEY

July 18, 1950         G. C. DRAPER         2,515,199
ATTITUDE INDICATOR

Filed Feb. 17, 1945                                                  6 Sheets-Sheet 6

INVENTOR
GEORGE C. DRAPER
By
Alan Awabey
ATTORNEY

Patented July 18, 1950

2,515,199

UNITED STATES PATENT OFFICE 2,515,199

ATTITUDE INDICATOR

George C. Draper, Westmount, Quebec, Canada

Application February 17, 1945, Serial No. 578,533

3 Claims. (Cl. 33—204)

Introduction

This invention relates to instruments for indicating the attitude of a craft or vehicle in relation to a reference plane. More specifically, the invention relates to an attitude indicator for aircraft to enable the pilot to determine the attitude of his aircraft relative to the horizontal plane.

The prior art

The type of instrument in current general use for this purpose is based on the principle of indicating to the pilot the relative position of his aircraft to a horizon line which, within limits, remains horizontal. The disadvantage in this type of instrument is that, although the horizon line remains horizontal and it is the aircraft including its other instruments which actually moves, the impression given to the pilot is that the horizon line moves. This apparent movement is in a direction opposite to the actual movement of the aircraft, so that the natural reaction of the pilot is to apply the opposite corrective movement to the controls. Correct interpretation requires mental effort on the part of the pilot and to the less experienced this can cause dangerous confusion and has resulted in many accidents.

Other instruments have been suggested which aim to overcome, to a certain extent, the difficulty described but they have shortcomings in other respects. For instance, in some the movement of the indicating device is limited, and, in others the mechanism actuating the moving parts is, for practical purposes, insufficiently accurate, too cumbersome, or inoperative.

Objects

Having regard to the foregoing, it is a principal object of the present invention to provide an indicating instrument to the indications of which a pilot will react in the correct sense without conscious mental effort. Further objects of the invention are to provide an instrument overcoming the disadvantages mentioned above and providing certain positive advantages as will hereafter become apparent.

The invention

With these and other objects in view, a preferred embodiment of the invention is constructed as follows. The indicator is a three dimensional replica of an aircraft which is so mounted and actuated that it takes up an attitude in relation to the longitudinal and transverse axes of the aircraft, corresponding to the actual attitude of the aircraft in relation to the horizontal plane. If the aircraft drops its left wing, the indicator does likewise. If it noses down, the indicator noses down. The construction is such that there is no limit to the movements of the indicator either in pitch or bank.

More specifically, the indicator includes a mounting adapted to be mounted in a craft, with its longitudinal and transverse axes parallel to those of the craft. A support is mounted for unlimited rotation about the longitudinal axis. The indicator is pivotally mounted on the support for unlimited rotation about the axis of pitch passing through the longitudinal axis and at right angles to it. The tail and nose of the indicator respectively includes indices. Supporting means extend above and below the indicator perpendicular to its transverse axis, the supporting means including indices substantially the same distance from the intersection of the longitudinal axis and the axis of pitch as the nose and tail indices. There is reference means located close to the indicator positioned to show by the relative position of the indices, the position of the indicator in pitch. The indicator is so mounted and means are provided so that the indicator is visible to the pilot of the craft from his normal piloting position. In one embodiment of the invention, the datum indicia are mounted on a curved transparent panel close to the indicator and the indices are preferably concentric datum rings referring to various degrees of pitch.

More specifically, a preferred embodiment of the invention includes an actuating unit mounted at any convenient place in an aircraft and an indicating unit is mounted on the instrument panel. The indicator is mounted in the indicating unit and its movements are governed by means of self-synchronous motors receiving their impulses from self-synchronous motors in the actuating unit. In an alternative preferred embodiment, the actuating and indicating mechanisms are combined. In this case, the indicator is on a gyroscopically controlled support and its movements relative to the axes of the aircraft are transmitted optically to a screen situated on the instrument panel

Detailed description

Preferred embodiments of the invention are illustrated schematically in the accompanying drawings, in which.

Indicating unit

Figure 1:
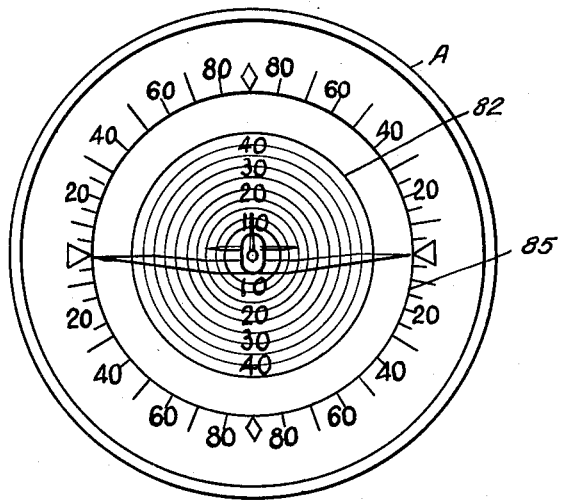
Figure 1 is a front elevation or pilot's view of the indicating unit.
Figure 2:
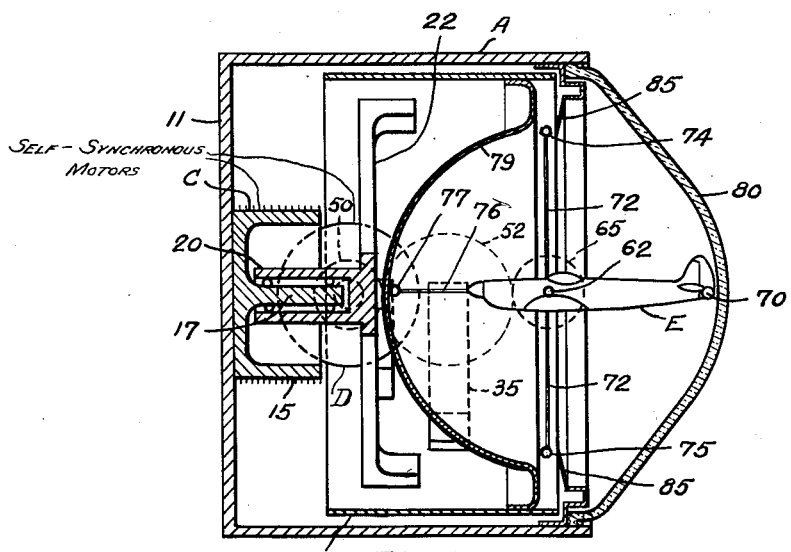
Figure 2 is a longitudinal vertical cross section showing, in elevation, parts of the indicating unit of Fig. 1.

Referring more particularly to the drawings, A represents the casing or mounting of the indicating unit and B the casing or mounting of the actuating unit of this particular embodiment of the invention. The casing A is preferably of cylindrical form, suitable for mounting on the instrument panel of the aircraft, and is provided with a rear wall 11. Carried centrally of the wall 11 is the stator of a self-synchronous motor C having a casing 15 and a centrally arranged shaft 17. On the shaft 17 is mounted, by means of suitable bearings, the rotor 20 of the motor C. The rotor 20 carries a spider bracket 22 on which is mounted a support, conveniently a cylinder 25. Extending from the bracket 22 and carried thereby is a bracket 27. On the bracket 27 are mounted brushes 30 cooperating with slip rings 32 mounted on the stator casing 15.

A bracket 35 mounted on the cylinder 25 carries the casing 37 of the stator of another self-synchronous motor D. Mounted on the spider bracket 22 is another bracket 39 which carries brushes 40 cooperating with slip rings 42 on an extension of the shaft 46 of the rotor 44 of the motor D. The shaft 46 is journalled by means of a jewel-type bearing 47 in the cylinder 25. The shaft 46 is also journalled in a suitable bearing 49 in the casing 37.

Carried on the shaft 46 is a gear wheel 50 meshing with a gear wheel 52 carried on a stub shaft 54 having jewel-type bearings 55 and 56 in the cylinder 25 and in a bracket 58 respectively, this bracket also being carried by the cylinder 25.

The front of the cylinder 25 carries jewel-type bearings 60 and 61 in which are journalled the ends of shafts 62 and 63 respectively which extend outwards from the wing tips of a miniature aircraft E serving as the indicator. The shaft 63 carries a gear wheel 65 meshing with the gear wheel 52.

The aircraft in its preferred form is a three dimensional replica of a conventional craft. For indicating purposes, it carries on its tail an indicating bead or index 70. The bead 70 is preferably of contrasting colour so as to be clearly visible to the pilot at all times. The indicator carries through its pivotal axis a shaft 72, which is perpendicular to both its transverse and longitudinal axes. The respective ends of the shaft 72 are provided with indicating beads 74 and 75 similar to the bead 70. Extending forwardly from the nose of the indicator is a shaft 76 on the end of which is an indicating bead 77.

The instrument is provided with a curved transparent front 80 of any suitable material. This transparent front carries concentric graduated rings 82 to be used in conjunction with the beads 70, 74, 75 and 77 for the purpose of determining the inclination of the indicating aircraft in pitch. Mounted near the front of the outer casing A is a dial 85 for the purpose of indicating in conjunction with the wing tips of the indicator, the attitude of the aircraft in bank. A background or shield 79 is attached to the cylinder 25.

Figure 3:
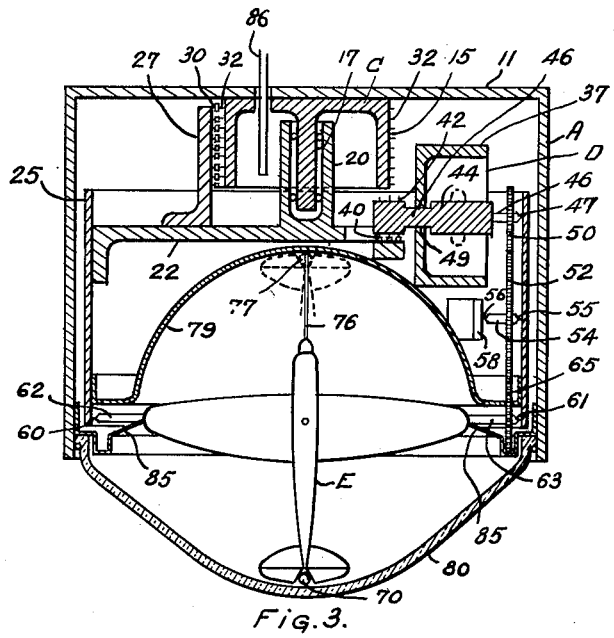
Figure 3 is a horizontal cross section showing, in plan, parts of the indicating unit of Fig. 1.
Figure 4:
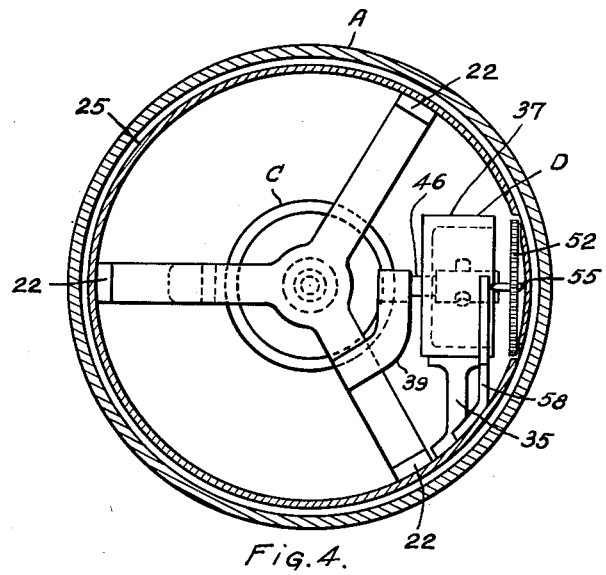
Figure 4 is a transverse vertical cross section, showing, in elevation, parts of the indicating unit shown in Fig. 1, looking towards the rear thereof.
Figure 5:
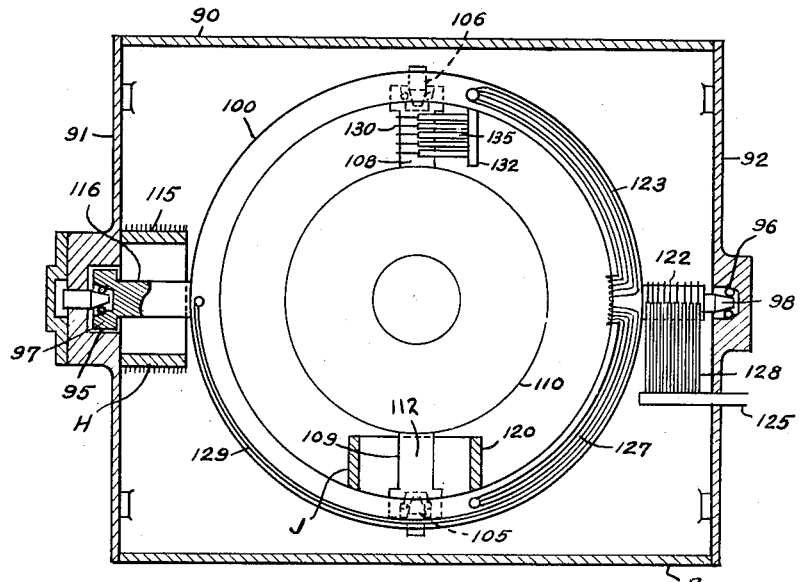
Figure 5 is a horizontal cross section showing, in plan, parts of the actuating unit.
Figure 6:
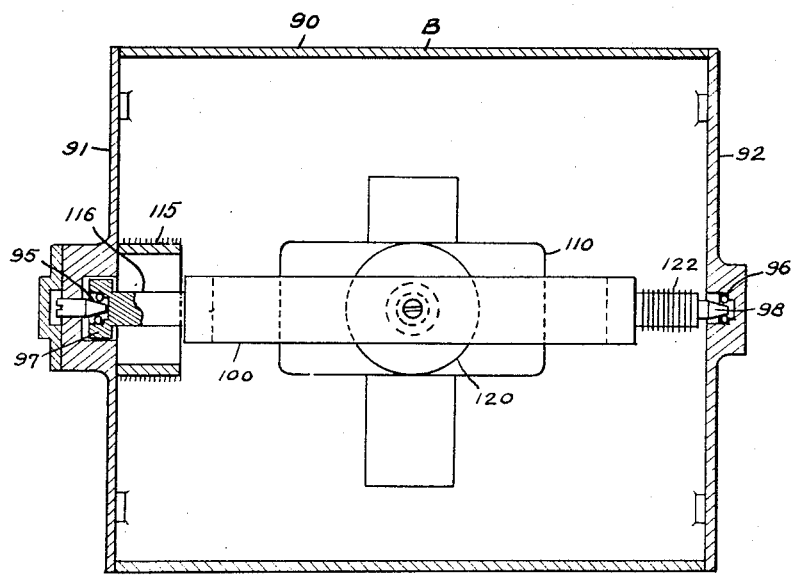
Figure 6 is a longitudinal vertical cross section showing, in elevation, parts of the actuating unit of Figure 5.
Figure 7:
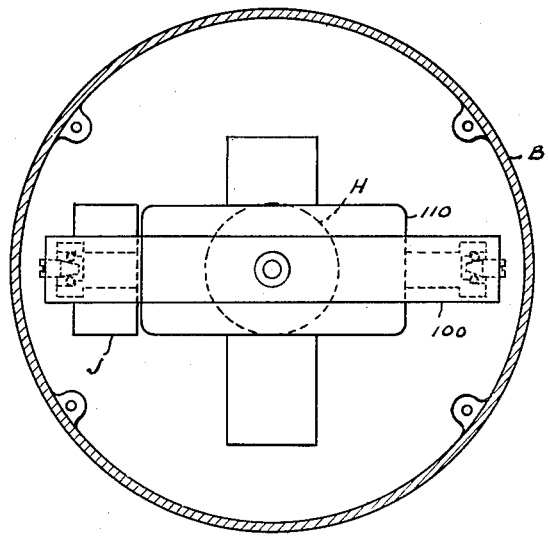
Figure 7 is a transverse vertical cross section showing, in elevation, parts of the actuating unit of Figure 5.

A conduit 86 shown in Figure 3 enters the rear wall 11 of the casing. Wires lead from the self-synchronous motors in the actuating unit through the conduit 86 and from here some wires lead to the stator of motor C, others to the slip rings 32. From the brushes 30 wires lead, via the bracket 27, the spider 22 and the bracket 39 to the brushes 40. Others lead to the stator of motor D and still others to the rotor 20 of the motor C.

Actuating unit

The casing B is fixedly mounted in the aircraft at a convenient place and in such a way that its longitudinal axis is parallel to that of the aircraft. The casing B is preferably cylindrical in form, having a body 90 and ends 91 and 92. The ends 91 and 92 are removable and secured to the body in any suitable manner. These ends are provided with bearings 95 and 96. These bearings journal the shafts 97 and 98 of the outer gimbal ring 100 of a gyroscope. The outer gimbal ring 100 is provided with bearings 105 and 106 carrying the ends of the shafts 108 and 109 of the inner gimbal ring 110 in which the gyroscope operates. The end 91 carries the stator 115 of a self-synchronous motor H. Mounted on the shaft 97 is the rotor 116 of the motor H.

Mounted on the outer gimbal ring 100 is the stator 120 of another self-synchronous motor J, the rotor of which is mounted on the shaft 109 of the inner gimbal ring 110. Carried on the shaft 98 are slip rings 122. A conduit 125 extends inwardly through the end 92 and from the conduit 125 extend a number of brushes 128 adapted to cooperate with the slip rings 122. The shaft 108 carries slip rings 130. Extending inwardly from the outer gimbal ring 100 is a conduit 132 carrying a series of brushes 135 adapted to cooperate with the slip rings 130.

From the slip rings 122 suitable wiring 123 leads along the outer gimbal ring 100 and through the conduit 132 to the brushes 135. Wiring (not shown) leads from the slip rings 130 through the inner gimbal ring 110 to the rotor 112 of the motor J. Other wiring (not shown) leads from the slip rings 130 to operate the gyroscope. Other wiring 127 leads to the stator of the motor J and wiring 129 leads to the rotor 116 of the motor H. Further wiring (not shown) leads from the conduit 125 through the casing B to the stator 115 of the motor H.

Electrical system

Suitable wiring connects the self-synchronous motors of the actuating unit to the self-synchronous motors of the indicating unit so that the relative movement between the casing B and the outer gimbal ring 100 is reproduced in the motor C of the indicating unit and the relative movement between the outer gimbal ring 100 and the inner gimbal ring 110 is reproduced in the motor D as will be well understood by one skilled in the art.

Figure 11:
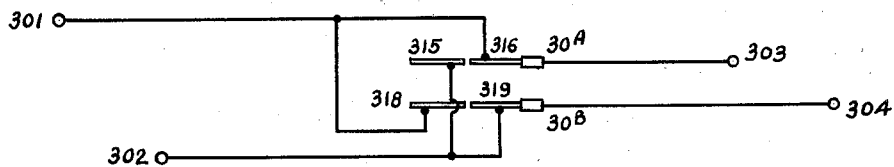
Figures 11 and 12 are wiring diagrams illustrating the method of connecting the pitch indicating motor to the pitch actuating motor of the device illustrated in Figures 1 to 7.
Figure 12:
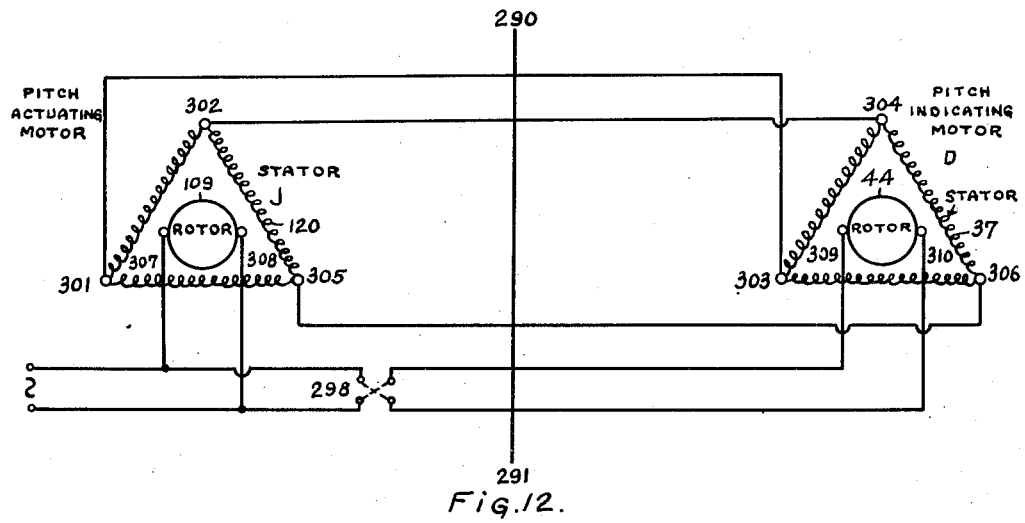

The accompanying diagrammatic Figures 11 and 12 showing the wiring between the motor J and the motor D will, from the following, also be understandable.

The line 290—291 in Figure 12 indicates schematically the point at which the wiring is connected to the slip rings 32 on the casing of motor C.

The rings to which terminals 301 and 302 are connected are each split into two semi-circular segments 315 and 316 and 318 and 319 respectively. These are shown in plan view in Figure 11. Two of the brushes of the group 30 are shown at 30a and 30b leading respectively to terminals 303 and 304. The wiring from terminal 301 is connected to segments 316 and 318. The wiring from terminal 302 is connected to segments 315 and 319. The purpose of these connections is to reverse the direction of movement of the rotor 44 when the indicator E passes beyond 90° from the horizontal in bank. A switch 298 (which can be operated manually) is incorporated for the purpose of reversing the wires leading to terminals 309 and 310. At a similar point in the wires leading to the rotor 20 a similar switch (not shown) is inserted. As indicated, the circuit in this particular arrangement includes a suitable source of alternating current.

Operation

The operation of this form of the device is as follows. The axis of spin of the gyroscope, due to the way it is mounted and operated, always remains vertical. A change of attitude of the aircraft in bank, causes a relative movement between the casing B and the outer gimbal ring 100 and consequently between the rotor and stator of self-synchronous motor H. This relative movement is communicated by the self-synchronous motor H to the self-synchronous motor C and thence to the indicator E. The wiring is such that the direction of bank of the indicator in relation to the transverse axis of the aircraft will be in the same direction as that of the aircraft in respect of the horizontal.

Similarly, when the aircraft changes its attitude in pitch, there is relative movement between the outer gimbal ring 100 and the inner gimbal ring 110 and this relative movement is communicated to the rotor of the motor D and hence to the indicator E. Again the wiring connections are such that the movement of the indicator E in relation to the longitudinal axis of the large aircraft is in the same sense as the movement of the longitudinal axis of the aircraft to the horizontal.

It will, of course, be understood that amplifying means including the necessary electrical equipment may be used to magnify the impulses from the motors H and J to the motors C and D and otherwise to facilitate the workings of the apparatus, as will be clear to one skilled in the art. It will also be evident that the movement of the indicator need not be exactly proportionate to that of the aircraft but may be varied through appropriate electrical and/or mechanical changes which do not alter the principle involved.

In certain aircraft manœuvres, usually only encountered in aerobatics, the direction of movement of the indicator E without the device described in Figures 11 and 12 would be in the incorrect sense. This undesirable condition is corrected by means of the divided slip rings 30a and 30b shown in Figures 11 and 12. Similarly, after certain combinations of manœuvres, the direction of the indicator E is reversed so that its nose points towards the tail of the aircraft. This undesirable attitude may be corrected by means of the switch 298 and the switch reversing the wires leading to rotor 20.

Alternative form

Figure 8:
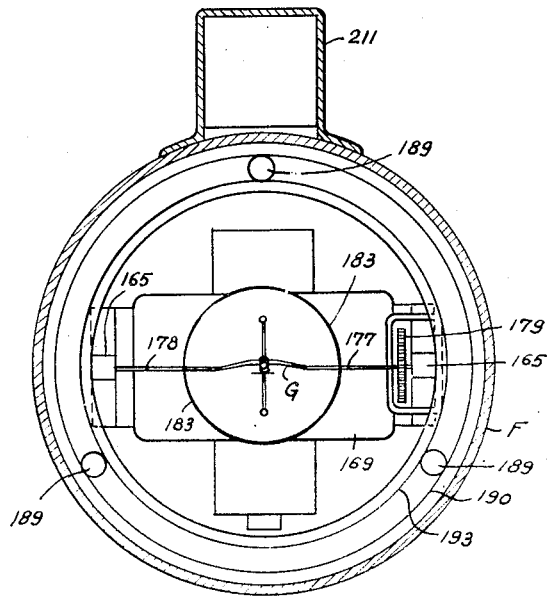
Figure 8 is a transverse vertical cross section of an alternate form of device showing parts as seen from the rear of the instrument.
Figure 9:
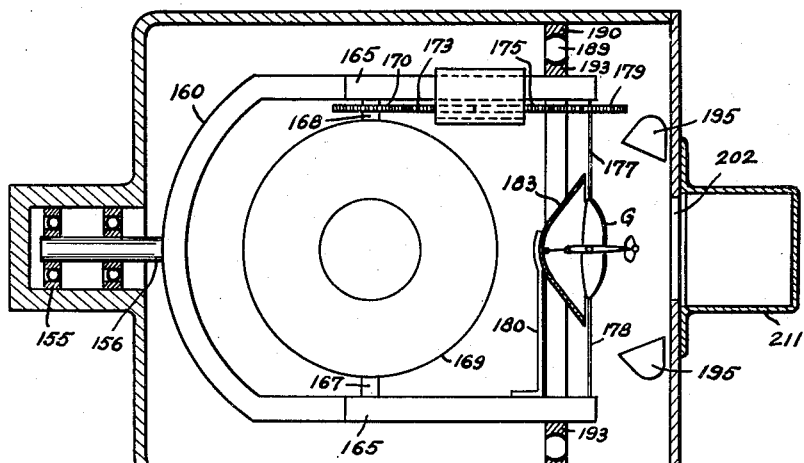
Figure 9 is a horizontal cross section showing, in plan, parts of the alternate form of device shown in Figure 8.
Figure 10:
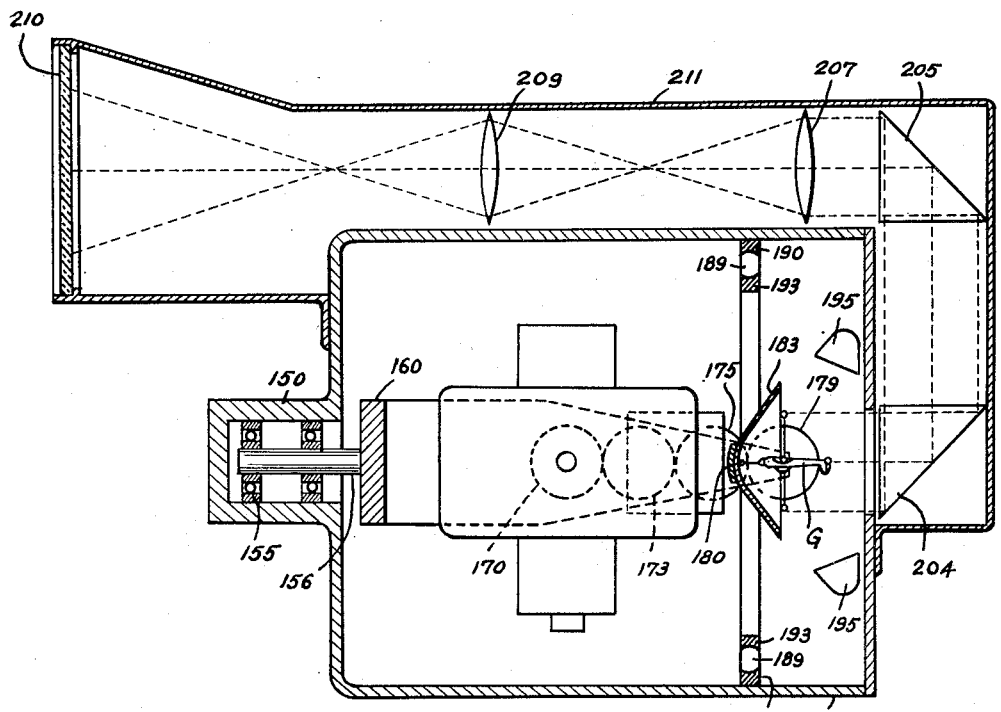
Figure 10 is a longitudinal vertical cross section showing, in elevation, parts of the alternate device shown in Figure 8.

The alternative form of device illustrated in Figures 8 to 10 comprises a casing F which carries the various parts of the instrument. The casing F includes a recess 150 in which are mounted bearings 155. The bearings 155 journal a shaft 156 on which is mounted a bifurcated gimbal ring or support 160 for a gyroscope. The ring 160 includes bearings 165 for the shafts or trunnions 167 and 168 of an inner gimbal ring 169 carrying a gyroscope. The shaft 168 carries a gear wheel 170 meshing with a gear wheel 173 suitably journalled for rotation on an arm of the ring 160. The gear wheel 173 meshes with another similarly mounted gear wheel 175. At the rear end of the gimbal ring 160 are journalled two shafts 177 and 178 extending outwards from the wing tips of a miniature aircraft G serving as the indicator and which is mounted in such a way that it is normally in an upside down attitude with its tail towards the nose of the aircraft. The shaft 177 carries a gear wheel 179 meshing with the gear wheel 175.

There may be employed, if desired, a bearing to take the weight of the mechanism towards the rear end of the ring 160. In the design illustrated, this bearing comprises gear wheels 189 working between a toothed annulus 190 on the casing and another toothed annulus 193 connected to the rear end of the outer gimbal ring 160. Lights 195 are provided to illuminate the indicator G. Extending out from one arm of the ring 160 is a bracket 180 which carries a shield or background 183.

The rear wall of the casing is provided with an opening 202. Mounted on the casing in rear of the opening 202 is a reflecting device, as for instance, a prism 204 adapted to reflect the image of the indicator upwards to a prism 205 mounted adjacent the top of the casing F. A pair of lenses 207 and 209 carry the reflected image to a screen 210 preferably of ground glass or other suitable material, which is mounted on the instrument panel. A casing 211 houses the lenses and prisms. The screen 210 carries concentric rings to be used in conjunction with beads or indices mounted on the indicator G as shown to determine the angle of pitch. The screen also carries a circular scale to be used in conjunction with the image of the wing tips of the indicator for determining the angle of bank so that the image seen by the pilot is substantially as shown in Figure 1 (when the aircraft is in level flight).

Operation

The operation of this alternative form of the invention is as follows. As in the case of the embodiment already described, the gyroscope in the inner gimbal ring 169 is arranged to maintain its spinning axis in a vertical direction, that is, in a similar sense to the device previously described. When the aircraft changes its attitude in the direction of bank, there is relative movement between the casing F and the outer gimbal ring 160 and, consequently, relative movement between the casing F and the indicator G, since it is carried in the arms of the outer gimbal ring 160. Movement of the aircraft in pitch causes relative movement between the outer gimbal ring 160 and the inner gimbal ring 169. This relative movement is communicated to the indicator G through the gear wheels 170, 173, 175 and 179 so that its movement in relation to the gimbal ring 160 is in the opposite sense to that of the inner gimbal ring 169.

When the aircraft is straight and level, the image of the indicator G is thrown on the screen 210 in such a way that, to the pilot, it appears in an upright position with the tail towards him. In other words, the image has been inverted in one sense. Moreover, the wing of the indicator which is to the pilot's right, that is, towards the starboard side of the aircraft will still be on the starboard side of the image as seen by the pilot. In other words, the image has not been inverted in this sense.

*Advantages and modifications*

The many advantages provided by the present invention will be apparent from the foregoing description.

It is to be understood that for the purpose of simplicity, conventional details of the various parts of the instruments shown have been illustrated diagrammatically and in cases omitted. For instance, the gyroscopes can be of conventional types, including the necessary impelling and erecting devices, etc. to enable them to function most efficiently, as will be well understood by one skilled in the art. The self-synchronous motors are also of conventional types and of a suitable size for their function. While the description has, for convenience been in terms of aircraft, it is to be understood that the teachings are not so limited but may be applied to instruments for any craft or vehicle whose attitude it is desirable to determine from time to time. More than one indicating unit can be employed so that the attitude of the aircraft can be read at different positions remote from the actuating unit.

It will be understood that various other modifications may be made in this invention without departing from the spirit thereof or the scope of the claims, and therefore, the exact forms shown are to be taken as illustrative only and not in a limiting sense, it being desired that only such limitations shall be placed thereon as may be imposed by the state of the prior art or are set forth in the accompanying claims.

The sub-titles used throughout the specification are merely to simplify reference thereto and should otherwise be disregarded.

I claim:

1. An attitude indicator, comprising, a mounting adapted to be mounted in a craft and having longitudinal and transverse axes parallel to those of the craft, a support mounted for unlimited rotation about said longitudinal axis, a three dimensional indicator simulating a craft pivotally mounted on said support for unlimited rotation about an axis of pitch, passing through said longitudinal axis and at right angles to it, a curved transparent front close to the indicator, an index for the tail of the indicator, an index for the nose of the indicator, supports extending from the indicator above and below it perpendicular to its longitudinal and transverse axes, respective indices on said supports, all said indices being equidistant from the intersection of said axes and at such a distance from said intersection that they are adapted to pass close to said front on movement of said indicator about its transverse axis.

2. An attitude indicator, according to claim 1, wherein the transparent front includes concentric datum rings arranged to indicate various degrees of pitch, the relationship of the indices to the rings indicating the degree of pitch of the indicator.

3. An attitude indicator, comprising, a mounting adapted to be mounted in a craft and having longitudinal and transverse axes parallel to those of the craft, a support mounted for unlimited rotation about said longitudinal axis, a three dimensional indicator simulating a craft pivotally mounted on said support for unlimited rotation about an axis of pitch, passing through said longitudinal axis and at right angles to it, an index for the tail of the indicator, an index for the nose of the indicator, supporting means, extending from the indicator above and below it perpendicular to its transverse axis, respective indices on said supporting means, reference means located close to the indicator and positioned to show by the relative position of the reference means and one or more of the indices the position of the indicator in pitch, said indices being equidistant from the intersection of said axes and at such a distance from said intersection that they are adapted to pass close to said reference means on movement of said indicator about its transverse axis.

GEORGE C. DRAPER.

REFERENCES CITED

The following references are of record in the file of this patent:

UNITED STATES PATENTS

| Number | Name | Date |
|---|---|---|
| 1,918,904 | Gette | July 18, 1933 |
| 2,038,059 | Reichel et al. | Apr. 21, 1936 |
| 2,080,490 | Kollsman | May 18, 1937 |
| 2,139,670 | Burgess | Dec. 13, 1938 |
| 2,170,087 | McPherson | Aug. 22, 1939 |
| 2,320,354 | Fedde | June 1, 1943 |
| 2,450,874 | Braddon | Oct. 12, 1948 |

FOREIGN PATENTS

| Number | Country | Date |
|---|---|---|
| 349,026 | Great Britain | May 19, 1931 |

OTHER REFERENCES

"Selsyns for Remote Signaling, Control and Indication," (published by the General Electric Co., Schenectady, N. Y.; 8 pages; received Feb. 16, 1939; Copy in Div. 66, 33—204.66)